Feb. 11, 1941.   C. W. TRESSLAR ET AL   2,231,783
TRIPOD HEAD
Filed Nov. 27, 1939   2 Sheets-Sheet 1
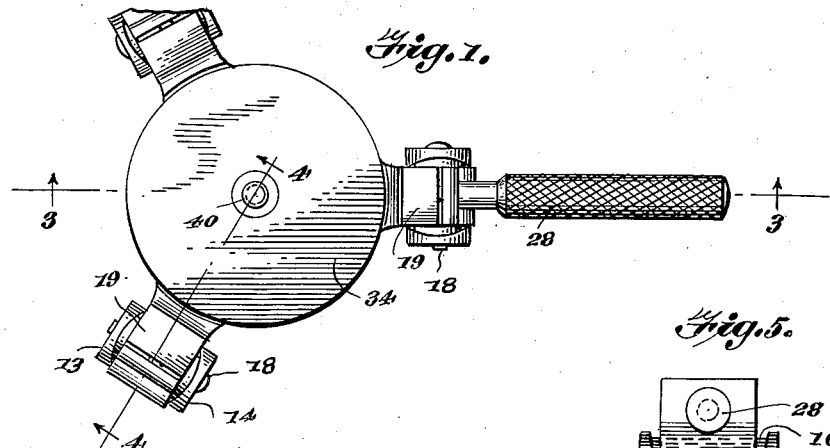
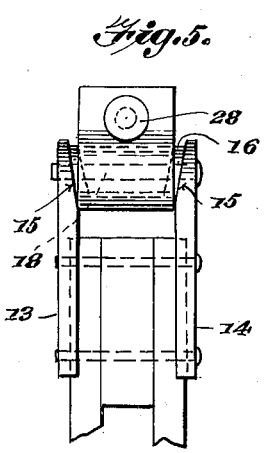
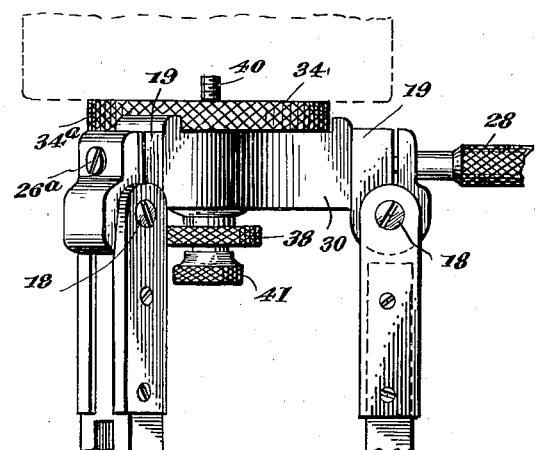
Inventors
C.W. TRESSLAR
A.F. STARBUCK Feb. 11, 1941. C. W. TRESSLAR ET AL 2,231,783
TRIPOD HEAD
Filed Nov. 27, 1939 2 Sheets-Sheet 2
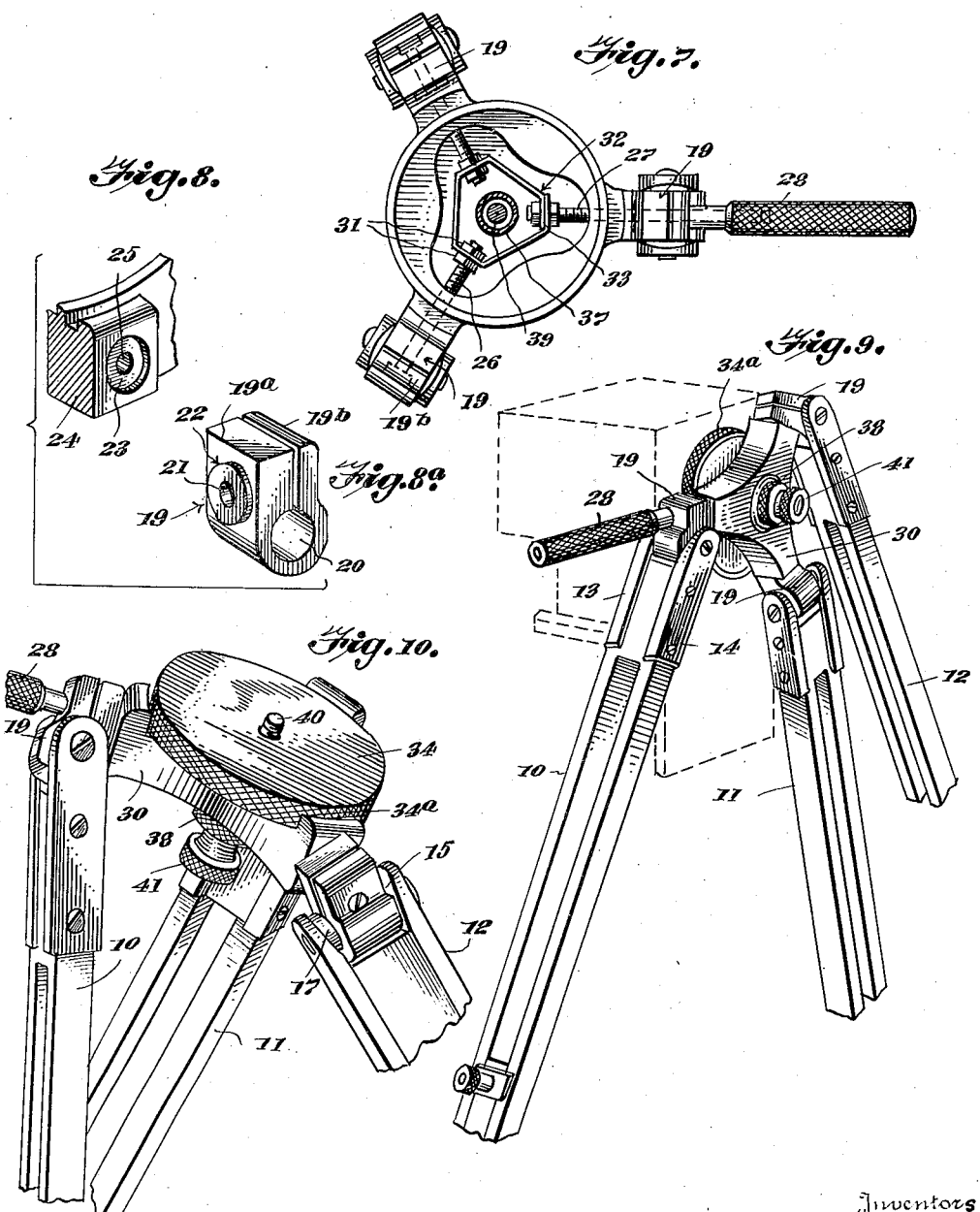

Patented Feb. 11, 1941

2,231,783

UNITED STATES PATENT OFFICE 2,231,783

TRIPOD HEAD

Charles W. Tresslar, La Habra, and Albert F. Starbuck, Whittier, Calif.

Application November 27, 1939, Serial No. 306,358

12 Claims. (Cl. 248—188)

This invention relates to a support of tripod type for holding devices such as cameras, telescopes, range finders, transits, levels, and a large range of other devices which require to be set in an accurately predetermined position for operation and use.

A principal object of the invention is to provide a tripod wherein the three legs thereof have a capability of easy and convenient universal adjustment with respect to the head of the tripod and with a capability of further adjustment with respect to the top plate or mounting on which the camera or the like is directly positioned. A further object is to provide means whereby all of the several adjustments between each leg and the head of the tripod, and between all of the legs and the tripod head may be clamped and held secure by a single clamping instrumentality that simultaneously reacts at each of the adjusting points of the three legs so that by the setting up thereof the tripod with its legs is clamped rigidly and held secure in any one of an unlimited range of adjusted positions.

The foregoing and other objects and advantages of the invention will be better understood from the following detailed description taken in connection with the accompanying drawings and the distinctive features of novelty will be thereafter pointed out in the appended claims.

Referring to the drawings,

Figure 1 is a plan view of a tripod embodying the invention with portions broken away;

Figure 2 is a side elevation thereof with portions of the legs broken away;

Figure 3 is a vertical section on line 3—3 of Figure 1;

Figure 4 is a vertical section on line 4—4 of Figure 1;

Figure 5 is a detail elevation on a large scale showing the application of one of the legs to the head;

Figure 6 is a detail vertical section of the showing of Figure 5 on line 6—6 of Fig. 3;

Figure 7 is a plan view of the device with the top table removed and the central support therefor in horizontal section;

Figures 8 and 8a are fragmentary perspectives, showing a detail as to the application of the legs to the head;

Figure 9 is a perspective view showing one capability of adjusted setting of the device; and Figure 10 is a similar perspective view showing another adjusted setting of the device, in both of the last two views, a portion of the legs being broken away.

10, 11, 12 indicate the three legs of the tripod, which may be of usual or any suitable construction. Each of these legs has secured to the upper end thereof by screws or bolts at opposite sides thereof, clamp plates 13, 14. These plates extend somewhat beyond the extremities of the legs proper, and these extremities have inner faces slightly beveled with respect to the lengthwise extent of the plates as indicated at 15. These plate extremities are also equipped with inner bosses or short projections 16 upon which is fitted a tube or thimble 17. This thimble has its ends beveled to correspond to the bevel or taper of the plate extremities, so as to fit thereagainst. A bolt 18 passed through one of these plates and threaded into the other, provides means for clamping the plates against the thimble 17 and holding this assembly immovable. Fitted to turn upon each thimble 17 is a bearing block or knuckle 19, the bore 20 of which fits the tube 17. Projecting ears 19a, 19b of the knuckle 19 are normally a small distance apart, and the knuckle is produced of material capable of a small resilience so that these ears may be drawn toward each other to clamp the knuckle upon the tube 17. For thus pressing these ears together, they are transversely apertured as indicated at 21 to loosely receive drawbolts. Each of the knuckles 19 has formed on one of the ears thereof a boss 22 through the center of which the aperture 21 passes. This boss fits into a recess 23 provided therefor in a head block or casting 24, this block having apertures 25 therein to receive loosely the drawbolts or screws which clamp the knuckles 19. Two of the knuckles or blocks 19 have ordinary threaded bolts 26 passed through the ears thereof with heads 26a recessed into the outer ears of the knuckles, these bolts passing with a very loose fit through the holes 25 of the tripod head or casting 24. The third one of the knuckles has passed through its ears a bolt or shaft 27 threaded at both ends, and having the threads on its outer end, which project outward from the knuckle adapted to receive a locking handle 28, which for this purpose has a threaded bore at its inner end, and may be suitably knurled for more effective hand grip. The tripod head or casting has a central cup portion 29 with three equidistantly disposed portions 30 extending radially outward therefrom, the ends of these portions being formed with the socket recesses 23 already described. The two bolts 26 and the threaded shaft 27 have their inner threaded ends extending into the central cup of the head or casting 29 where they are secured by nuts 31 to a stout metal strap 32, which is generally of equilateral triangle form with truncated corners to which the bolts 26, 27 are secured. The straps 32 may conveniently be made from a piece of stout sheet or plate metal bent to the described shape with its extremities overlapping at one of the truncated corner portions, where these extremities are secured by the nuts 31 as indicated at 33. 34 denotes a circular top table or casting, having its periphery knurled or otherwise faced as indicated at 34a. This table has a depending peripheral flange 34b formed with an interior bearing adapted to fit arc portions of a circular bearing, as indicated at 35, formed in the top of the projections 30 of the head casting 24, so that the table 34 may turn freely when released, upon the tripod head 24. For clamping the table 34 in adjusted position upon the head 24, it has a central bore with a surrounding depending boss as indicated at 36 in which is threaded a tube 37. This tube extends below the bottom of the head 24 where it is threaded to receive a knurled nut 38, the turning up of which will clamp the table securely to the head 24. Through this tube a shaft 39 extends upwardly presenting a threaded upper portion with a projection 40 extending a small distance above the table and adapted to receive the camera, or other object to be supported. A bushing 40a may be pressed or otherwise secured in the upper portion of the tube 37 with the shaft 39 threaded therethrough, this permitting such shaft to be screwed downward so that the projection 40 does not extend above the table top when this may be desirable. The shaft 39 has a knurled head 41 at its lower end, engaging the lower end of the tube 37 and by which the shaft 39 may be turned to secure the camera upon the table.

It is to be noted that the described construction provides a tripod head that is truly universal in its range of adjustments and so that the camera or other instrument held thereby may be set in any position whatsoever that may be desired. Thus the legs, or one or more of them, may be adjusted inwardly or outwardly through the required range, turning on the bearing 20 provided therefor in the blocks or knuckles 19 while the legs, or one or more of them, have a full circular range of adjustment in planes tangential to the head by turning in the bearings 23 of the head. The parts are rigidly and securely clamped in any adjusted position to which they may be set by the single operating instrumentality comprising the knurled handle 28 which not only clamps up the knuckle 19 through which the shaft 27 passes, but by pulling on the strap 32 exerts a pulling action on the bolts 26 to clamp the other two legs in adjusted positions. In practice the knuckles 19, which is engaged by the handle 28 is preferable slightly recessed to receive a friction washer 28a, which besides affording a friction surface for the handle to press against, also serves to center the shaft 27, which as stated fits loosely through the holes in the block or knuckles 19. It is to be observed that in each locality of adjustment, the bearings provided are ample and rugged, so that upon clamping the parts together as described, the tripod head is exceptionally rigid and free from vibration or swaying. The further turning adjustment of the top table 34 on its axis completes the universality of adjustments, and it will be noted that this table also has a rigid and secure bearing on the head casting 24.

We are aware that the invention may be embodied in other specific forms without departing from the spirit or essential attributes thereof, and we therefore desire the present embodiment to be considered in all respects as illustrative and not restrictive, reference being had to the appended claims rather than to the foregoing description to indicate the scope of the invention.

Having now described our invention, what we claim as new and desire to secure by Letters Patent is:

1. A tripod comprising a head having a tangential bearing area, a block fitted to turn on said bearing area, a leg mounted to turn in said block on an axis at right angles to the adjustment of said block, and means for simultaneously clamping said bearing area of said block rigidly to said head and said leg rigidly to said block.

2. A tripod comprising a head having equally spaced apart peripheral bearing areas, blocks having a full circular range of adjustment on said bearing areas, legs mounted in said blocks for angular adjustment on axes at right angles to the adjustment of said blocks, and means for simultaneously clamping rigidly said legs to said blocks and said blocks to said tripod head.

3. A tripod comprising a head as set forth in claim 2, equipped with means having a common actuating instrumentality for simultaneously clamping rigidly all of said blocks to said head.

4. A tripod comprising a head as set forth in claim 2, equipped with means having a common actuating instrumentality for simultaneously clamping rigidly all of said legs to said blocks.

5. A tripod comprising a head as set forth in claim 2, equipped with means having common actuating instrumentality for simultaneously clamping rigidly all of said legs to said blocks and all of said blocks to said tripod head.

6. A tripod feature comprising a head having a circular bearing at its periphery, a split block equipped with ears and with one of said ears fitted for adjustment on said circular bearing, a bolt passed through said ears and through the circular bearing of said head, adapted to simultaneously clamp said block to said head and to press said ears together, said block having a bearing bore therethrough adjacent said ears and at right angles to said bolt, and a leg having a bearing fitted in said bore and adapted to be clamped rigidly therein by the setting up of said bolt.

7. A tripod feature as set forth in claim 6 wherein the tripod head has three equally spaced apart peripheral areas with split blocks fitted thereto and with a common means for simultaneously clamping all of said blocks rigidly to said head, and all of said legs rigidly to said blocks.

8. A tripod feature as set forth in claim 6 wherein the bolt which clamps the block to the head is connected with two other bolts, similarly clamping two other like blocks to the head, said last named bolts and blocks spaced equidistantly around the head with the bolts extending radially outward from the head, and with one of said bolts having an operating means for actuating all of them to clamp rigidly all of said bearings simultaneously.

9. A tripod comprising a head with three spaced legs depending therefrom said legs mounted with a capability of adjustment in two planes at right angles to each other with respect to said head, and a common means for simultaneously clamping all of said legs rigidly in adjusted position with respect to said head.

10. A tripod comprising a head having a top table mounted for rotative adjustment thereon with three legs equidistantly spaced around the periphery of said head with a capability of adjustment in two planes at right angles to each other with respect to said head, and a single means associated with one of said legs having connections for simultaneously clamping all of them rigidly with respect to said head in any adjusted position.

11. A tripod feature comprising a head having a bearing block fitted for angular adjustment thereon, said block having a bearing bore at right angles to the axis of its adjustment, and a leg having at its end a tube fitted in said bore, said tube having beveled ends, and the leg having clamp plates correspondingly beveled, with means for drawing said plates against the ends of said tube to hold the tube immovable with respect thereto.

12. In a tripod, a head equipped with a portion having a bore therethrough, a tube fitted to turn in said bore and having its ends beveled, means for clamping said tube fixedly in adjusted positions with respect to said head, and a leg having extensions correspondingly beveled to engage the tube ends, with means for drawing said extensions toward each other and against the tube ends to hold the tube immovable with respect to the leg.

CHARLES W. TRESSLAR.
ALBERT F. STARBUCK.